Patented May 11, 1954

2,678,322

UNITED STATES PATENT OFFICE 2,678,322

PROCESS FOR THE PREPARATION OF p-(ACYLSULFAMYL) DERIVATIVES OF ANILIC ACID

Michael N. Dvornikoff, St. Louis, and Evan J. Young, Valley Park, Mo., assignors to Monsanto Chemical Company, St. Louis, Mo., a corporation of Delaware No Drawing. Application October 27, 1950, Serial No. 192,605

11 Claims. (Cl. 260—397.7)

This invention relates to an improved process for the preparation of p-(acylsulfamyl) derivatives of anilic acids which may be represented by the following formula

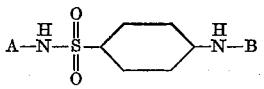

wherein A represents an acyl radical derived from a monocarboxylic acid and B represents a monoacyl radical derived from a dicarboxylic acid.

The above described derivatives have wide spread utility as pharmaceuticals. Heretofore, they have been prepared by a two-step process involving two separate and distinct reaction mixtures. Thus, sulfanilamide was first reacted with a dicarboxylic acid anhydride or chloride in a suitable medium and the p-sulfamyl derivative of the anilic acid thus formed isolated therefrom. The p-sulfamyl derivative of the anilic acid thus obtained was then further acylated by reacting it with the anhydride or chloride of a monocarboxylic acid in a suitable medium and the desired p-(acylsulfamyl) derivative of the anilic acid recovered therefrom. This process has not proven to be too satisfactory. First of all, time cycles are exceptionally long in view of the isolation procedure. Secondly, it has been observed that in certain of these reactions, some decomposition results. Consequently, over-all yields in the processes as heretofore practiced have not been too satisfactory.

It is an object of this invention to provide an improved process for the preparation of the previously described p-(acylsulfamyl) derivatives of anilic acids. Further objects will become apparent from the description of the novel process of this invention.

It has now been discovered that highly improved yields of these derivatives hereinbefore described may be obtained by reacting sulfanilamide and a dicarboxylic acid anhydride or chloride in pyridine to form the p-sulfamyl derivative of the anilic acid and then without isolation, reacting the p-sulfamyl derivative of the anilic acid in the pyridine reaction mixture thus obtained with the anhydride or chloride of a monocarboxylic acid. The quantity of the desired p-(acylsulfamyl) derivative recovered from a single reaction mixture obtained according to the novel process of this invention represents a significantly greater over-all yield than was heretofore obtainable; yet, the time cycle of the novel process of this invention is significantly shorter than that of the process heretofore used, and the tedious and difficult isolation procedure of the intermediate has been eliminated. The following examples are illustrative of the novel process of this invention, wherein all parts are by weight unless otherwise noted:

EXAMPLE I p'-(Acetylsulfamyl)phthalanilic acid 172 parts of sulfanilamide are dissolved in 800 parts of pyridine contained in a suitable vessel. With constant agitation and while maintaining a temperature of approximately 30° C., 156 parts of phthalic anhydride are added and the reaction mixture then heated to a temperature of approximately 55° C. 306 parts of acetic anhydride are then slowly added to the reaction mixture and the temperature increased to 100° C., maintaining the reaction mixture at this temperature with constant agitation until a clear solution results.

The reaction mixture is then cooled to about 75° C. and 2,400 parts of water added. The resultant thick slurry is then filtered and the precipitate washed with 675 parts of water.

The precipitate is then reslurried with 1,000 parts of water and, while maintaining a temperature of approximately 30° C., dissolved by adding a 50% sodium hydroxide solution until the reaction mixture is alkaline to phenolphthalein. The solution is then filtered to remove any undissolved impurities, and then, while maintaining a temperature of approximately 25° C., approximately 545 parts of a 20% hydrochloric acid solution are added precipitating p'-(acetylsulfamyl)-phthalanilic acid. The precipitated derivative is then removed by filtration, washed with 500 parts of water and dried by heating to a temperature of approximately 70° C. under reduced pressure.

Based upon the sulfanilamide initially charged, approximately a 91% yield of substantially pure p'-(acetylsulfamyl)phthalanilic acid is obtained having a melting point of 197–198° C.

EXAMPLE II p'-(Benzoylsulfamyl)phthalanilic acid

In accordance with the procedure described in Example I, an excellent yield of substantially pure p'-(benzoylsulamyl)phthalanilic acid is obtained utilizing 34.4 parts by weight of sulfanilamide, 160 parts by weight of pyridine, 31.2 parts by weight of phthalic anhydride and 84.0 parts by weight of benzoyl chloride.

EXAMPLE III p-(Acetylsulfamyl)succinanilic acid

In accordance with the procedure described in Example I, an excellent yield of substantially pure p-(acetylsulfamyl)succinanilic acid is obtained utilizing 34.4 parts sulfanilamide, 160 parts of pyridine, 21.0 parts of succinic anhydride and 61.2 parts of acetic anhydride.

EXAMPLE IV p-(Benzoylsulfamyl)succinanilic acid

Utilizing 34.4 parts of sulfanilamide, 160 parts of pyridine, 21.0 parts of succinic anhydride and 84.4 parts of benzoyl chloride in accordance with the procedure described in Example I, an excellent yield of substantially pure p-(benzoylsulfamyl)succinanilic acid is obtained.

EXAMPLE V p-(Propionylsulfamyl)adipanilic acid

Utilizing 34.4 parts of sulfanilamide, 160 parts of pyridine, 38.2 parts of adipyl chloride and 78.1 parts of propionic anhydride in accordance with the procedure described in Example I, an excellent yield of substantially pure p-(propionylsulfamyl)adipanilic acid is obtained.

While specific reactants, quantities of reactants and reaction conditions have been set forth in the preceding examples, it will be obvious to those skilled in the art that such factors may be subject to substantial variation. For example, the temperature maintained during the reaction of the sulfanilamide and the dicarboxylic acid anhydride or chloride may be varied over a substantial range, limited only by the freezing point and boiling point of the reaction mixture. Preferably, the reaction is carried out while maintaining a temperature in the range of from about 0° C. to about 115° C.

The quantities of the reactants utilized in this stage of the reaction may also be varied over a substantial range. Since, however, the reaction between the sulfanilamide and the dicarboxylic acid chloride or anhydride is essentially a quantitative reaction, it is preferred that approximately equimolecular proportions of these reactants be utilized. The quantity of pyridine utilized in the reaction medium may also be varied substantially. Inasmuch as during the novel process of this invention the pyridine salt of the desired p-(acylsulfamyl) derivative of an anilic acid is formed, it is preferred that at least a one molecular proportion of pyridine be utilized for each one molecular proportion of the sulfanilamide initially charged with the excess of pyridine over and above this amount being that amount which is necessary to form a fluid reaction medium. Obviously, therefore, considerable excesses of pyridine can be utilized.

During the second phase of the novel process of this invention, i. e., during the reaction of the p-sulfamyl derivative of the anilic acid and the monocarboxylic acid anhydride or chloride, the temperature may also be varied over a wide temperature range with the limits being governed by the freezing point and the boiling point of the reaction mixture. Preferably, however, the temperature during this reaction is maintained within the range of from about 0° C. to about 115° C.

It has been found that best results are obtained when at least a one equivalent proportion of the monocarboxylic acid anhydride or chloride is utilized for each one molecular proportion of the sulfanilamide initially charged. Considerable excesses of the monocarboxylic acid anhydride or chloride may be utilized. Thus, as high as 5 or more equivalent proportions of the monocarboxylic acid anhydride or chloride may be utilized for each one molecular proportion of the sulfanilamide charged.

After the reaction as above described is complete, the desired p-(acylsulfamyl) derivative of the anilic acid may be recovered from the reaction mixture by any method well known to those skilled in the art. Preferably, the reaction mixture is diluted with water, precipitating the pyridine salt of the anil form of the derivative, the salt separated therefrom by filtration and redissolved in an aqueous alkali metal hydroxide solution, thereby forming a solution of the di-(alkali metal) salt of the desired derivative. Neutralization of this solution with a mineral acid, such as hydrochloric acid, precipitates the p-(acylsulfamyl) derivative of the anilic acid which may be recovered therefrom by filtration.

In carrying out the novel process of this invention, any of the monocarboxylic acid anhydrides or chlorides may be utilized. Typical of such anhydrides and chlorides are those of acetic acid, propionic acid, butyric acid, valeric acid, phenylacetic acid, dichloroacetic acid, benzoic acid, etc. Similarly, in the process as previously described, any of the dicarboxylic acid chlorides or anhydrides may be utilized, typical of which are the chlorides and anhydrides of oxalic acid, malonic acid, maleic acid, succinic acid, pimelic acid, gamma-ketopimelic acid, sebacic acid, phthalic acid, etc.

What is claimed is:

1. In a process for the preparation of a product convertible to p'-(acetylsulfamyl)-phthalanilic acid by dissolving said product in an aqueous alkali metal hydroxide solution and then neutralizing the solution, the steps comprising reacting a one molecular proportion of sulfanilamide and approximately a one molecular proportion of phthalic anhydride in pyridine to form p'-sulfamylphthalanilic acid, and then reacting the p'-sulfamylphthalanilic acid in the reaction mixture thus obtained with at least a one equivalent proportion of acetic anhydride.

2. In a process for the preparation of a product convertible to p'-(benzoylsulfamyl)phthalanilic acid by dissolving said product in an aqueous alkali metal hydroxide solution and then neutralizing the solution, the steps comprising reacting a one molecular proportion of sulfanilamide and approximately a one molecular proportion of phthalic anhydride in pyridine to form p'-sulfamylphthalanilic acid, and then reacting the p'-sulfamylphthalanilic acid in the reaction mixture thus obtained with at least a one equivalent proportion of benzoyl chloride.

3. In a process for the preparation of a product convertible to p-(acetylsulfamyl)succinanilic acid by dissolving said product in an aqueous alkali metal hydroxide solution and then neutralizing the solution, the steps comprising reacting a one molecular proportion of sulfanilamide with approximately a one molecular proportion of succinic anhydride in pyridine to form p-sulfamylsuccinanilic acid, and then reacting the p-sulfamylsuccinanilic acid in the reaction mixture thus formed with at least a one equivalent proportion of acetic anhydride.

4. In a process for the preparation of a product convertible to p-(benzoylsulfamyl) succinanilic acid by dissolving said product in an aqueous alkali metal hydroxide solution and then neutralizing the solution, the steps comprising reacting a one molecular proportion of sulfanilamide and approximately a one molecular proportion of succinic anhydride in pyridine to form p-sulfamylsuccinalinic acid and then reacting the p-sulfamylsuccinanilic acid in the reaction mixture thus obtained with at least a one equivalent proportion of benzoyl chloride.

5. In a process for the preparation of a product convertible to p'-(acetylsulfamyl)phthalanilic acid by dissolving said product in an aqueous alkali metal hydroxide solution and then neutralizing the solution, the steps comprising reacting a one molecular proportion of sulfanilamide and approximately a one molecular proportion of phthalic anhydride in pyridine while maintaining a temperature in the range of from about 0° C. to about 115° C., to form p'-sulfamylphthalanilic acid, and then reacting the p'-sulfamylphthalanilic acid in the reaction mixture thus obtained with at least a one equivalent proportion of acetic anhydride while maintaining a temperature in the range of from about 0° C. to about 115° C.

6. In a process for the preparation of a product convertible to p'-(benzoylsulfamyl)phthalanilic acid by dissolving said product in an aqueous alkali metal hydroxide solution and then neutralizing the solution, the steps comprising reacting a one molecular proportion of sulfanilamide and approximately a one molecular proportion of phthalic anhydride in pyridine while maintaining a temperature in the range of from about 0° C. to about 115° C., to form p'-sulfamylphthalanilic acid, and then reacting the p'-sulfamylphthalanilic acid in the reaction mixture thus obtained with at least a one equivalent proportion of benzoyl chloride while maintaining a temperature in the range of from about 0° C. to about 115° C.

7. In a process for the preparation of a product convertible to p-(acetylsulfamyl) succinanilic acid by dissolving said product in an aqueous alkali metal hydroxide solution and then neutralizing the solution, the steps comprising reacting a one molecular proportion of sulfanilamide with approximately a one molecular proportion of succinic anhydride in pyridine while maintaining a temperature in the range of from about 0° C. to about 115° C., to form p-sulfamylsuccinanilic acid, and then reacting the p-sulfamylsuccinanilic acid in the reaction mixture thus formed with at least a one equivalent proportion of acetic anhydride while maintaining a temperature in the range of from about 0° C. to about 115° C.

8. In a process for the preparation of a product convertible to p-(benzoylsulfamyl) succinanilic acid by dissolving said product in an aqueous alkali metal hydroxide solution and then neutralizing the solution, the steps comprising reacting a one molecular proportion of sulfanilamide and approximately a one molecular proportion of succinic anhydride in pyridine while maintaining a temperature in the range of from about 0° C. to about 115° C., to form p-sulfamylsuccinanilic acid, and then reacting the p-sulfamylsuccinanilic acid in the reaction mixture thus obtained with at least a one equivalent proportion of benzoyl chloride while maintaining a temperature in the range of from about 0° C. to about 115° C.

9. In a process for the preparation of a product convertible to p-(acylsulfamyl) derivatives of anilic acids by dissolving said product in an aqueous alkali metal hydroxide solution and then neutralizing the solution, the steps comprising reacting sulfanilamide and a compound selected from the group consisting of acid anhydrides and acid chlorides of dicarboxylic acids selected from the group consisting of saturated alkyl dicarboxylic acids containing not over 10 carbon atoms, inclusive, maleic acid, gamma-keto pimelic acid and phthalic acid, in pyridine to form a p-sulfamyl derivative of an anilic acid, and then reacting the p-sulfamyl anilic acid in the reaction mixture thus obtained with a compound selected from the group consisting of acid anhydrides and acid chlorides of mono-carboxylic acids selected from the group consisting of saturated alkyl mono-carboxylic acids containing 2 to 5 carbon atoms, inclusive, dichloroacetic acid, phenylacetic acid, and benzoic acid.

10. In a process for the preparation of a product convertible to p-(acylsulfamyl) derivatives of anilic acids by dissolving said product in an aqueous alkali metal hydroxide solution and then neutralizing the solution, the steps comprising reacting a one molecular proportion of sulfanilamide and approximately a one molecular proportion of a compound selected from the group consisting of acid anhydrides and acid chlorides of dicarboxylic acids selected from the group consisting of saturated alkyl dicarboxylic acids containing not over 10 carbon atoms, inclusive, maleic acid, gamma-keto pimelic acid and phthalic acid, in pyridine to form a p-sulfamyl derivative of an anilic acid, and then reacting the p-sulfamyl anilic acid in the reaction mixture thus obtained with at least one equivalent proportion of a compound selected from the group consisting of acid anhydrides and acid chlorides of mono-carboxylic acids selected from the group consisting of saturated alkyl mono-carboxylic acids containing 2 to 5 carbon atoms, inclusive, dichloroacetic acid, phenylacetic acid, and benzoic acid.

11. In a process for the preparation of a product convertible to p-(acylsulfamyl) derivatives of anilic acids by dissolving said product in an aqueous alkali metal hydroxide solution and then neutralizing the solution, the steps comprising reacting a one molecular proportion of sulfanilamide and approximately a one molecular proportion of a compound selected from the group consisting of acid anhydrides and acid chlorides of dicarboxylic acids selected from the group consisting of saturated alkyl dicarboxylic acids containing not over 10 carbon atoms, inclusive, maleic acid, gamma-keto pimelic acid and phthalic acid, in pyridine while maintaining the temperature in the range of from about 0° C. to about 115° C. to form a p-sulfamyl derivative of an anilic acid, and then reacting the p-sulfamyl anilic acid in the reaction mixture thus obtained with at least one equivalent proportion of a compound selected from the group consisting of acid anhydrides and acid chlorides of mono-carboxylic acids selected from the group consisting of saturated alkyl mono-carboxylic acids containing 2 to 5 carbon atoms, inclusive, dichloroacetic acid, phenylacetic acid, and benzoic acid while maintaining the temperature in the range of from about 0° C. to about 115° C.

References Cited in the file of this patent

UNITED STATES PATENTS

| Number | Name | Date |
|---|---|---|
| 2,383,874 | Martin et al. | Aug. 28, 1945 |
| 2,411,495 | Dohrn et al. | Nov. 19, 1946 |
| 2,456,051 | Hultquist et al. | Dec. 14, 1948 |
| 2,576,825 | Delmar | Nov. 27, 1951 |

FOREIGN PATENTS

| Number | Country | Date |
|---|---|---|
| 502,558 | Great Britain | Mar. 19, 1939 |
| 557,985 | Great Britain | Dec. 14, 1943 |

OTHER REFERENCES

Sikdar et al.: "J. Indian Chem. Soc.," vol. 22 (1945), pp. 343-5.

Miller et al.: "J. Am. Chem. Soc.," vol. 61 (1939), pp. 1198-1200.

Crossley et al.: "J. Am. Chem. Soc.," vol. 61 (1939), pp. 2950-55.

Moore et al.: "J. Am. Chem. Soc.," vol. 64 (1942), pp. 1572-5.

Dewing: "J. Chem. Soc." (London), (1942), pp. 239-244.